United States Patent [19]
Troiani et al.

[11] Patent Number: 6,089,268
[45] Date of Patent: Jul. 18, 2000

[54] DUAL VALVE FITTING FOR ENABLING QUICK MEASUREMENT OF PRESSURE

[75] Inventors: Vincent F. Troiani, New Florence; Gregory L. Johnston, Tarentum; John B. Carroll; Gary M. Sich, both of Irwin; Wei Li, Pittsburgh; Robert D. Dimsa, Elizabeth; Michael J. Veltri; Daniel G. Scott, both of Pittsburgh, all of Pa.

[73] Assignee: Westinghouse Air Brake Company, Wilmerding, Pa.

[21] Appl. No.: 09/144,621

[22] Filed: Aug. 31, 1998

Related U.S. Application Data

[62] Division of application No. 08/968,271, Nov. 12, 1997.

[51] Int. Cl.[7] ..................................................... F16L 37/28
[52] U.S. Cl. ................ 137/614.11; 137/613; 251/149.6
[58] Field of Search .......................... 137/614.11, 614.18, 137/614.2, 613; 251/149.1, 149.6

[56] References Cited

U.S. PATENT DOCUMENTS

| | | | |
|---|---|---|---|
| 4,509,554 | 4/1985 | Failla | 137/614.04 X |
| 4,971,107 | 11/1990 | Yonezawa | 137/614.05 X |
| 5,465,754 | 11/1995 | Sudo et al. | 137/614.2 |

*Primary Examiner*—Kevin Lee
*Attorney, Agent, or Firm*—James Ray & Associates

[57] ABSTRACT

A dual valve fitting enables pressure within a housing to be quickly measured. The fitting includes first and second valve bodies. The first body defines a passage between its threaded and protuberant ends. In the passage, a first valve atop a valve stem features a poppet head that is seatable against an outer valve seat. A first biasing mechanism compels the poppet head against the outer valve seat so that the first valve is normally closed. The second body defines a bore between its upper and lower threaded ends which communicates with the passage. The upper threaded end connects with the threaded end of the first body whereas the lower threaded end is designed to screw into a threaded bore of the housing. In the bore, a second valve features a retainer whose top defines a recess that retains a seal element that is seatable against an inner valve seat. A second biasing mechanism acts upon the retainer so that the seal element therein seats against the inner valve seat thereby rendering the second valve normally closed. A stem extension is disposed between a bottom of the valve stem and the top of the seal element. When a female coupler of a quick connect device is mated to the protuberant end, the female coupler causes translation of the valve stem, the stem extension and the retainer thereby opening both the first and second valves. This allows air to flow from the housing through the fitting and into the female coupler.

6 Claims, 5 Drawing Sheets

FIG. 8 ial application of U.S. application Ser. No. 08/968,271 filed Nov. 12, 1997.
DUAL VALVE FITTING FOR ENABLING QUICK MEASUREMENT OF PRESSURE

CROSS-REFERENCE TO RELATED APPLICATIONS

This application is a divisional application of U.S. application Ser. No. 08/968,271 filed Nov. 12, 1997.

This application is related to a U.S. application for patent entitled Dual Seal Fitting For Enabling Quick Measurement Of Brake Cylinder Pressure, Ser. No. 08/901,096, filed on Jul. 28, 1997, U.S. Pat. No. 5,869,765. The copending application is assigned to the assignee of this invention, and its teachings are incorporated into the present document by reference.

FIELD OF THE INVENTION

The present invention generally relates to a mechanism through which to gain access to a pressure to be measured. More particularly, the invention relates to a dual valve fitting that allows quick measurement of pressure contained within a load sensor of empty and load freight brake equipment on a railcar.

BACKGROUND OF THE INVENTION

A typical freight train includes one or more locomotives, a plurality of railcars and a pneumatic trainline referred to as a brake pipe. The brake pipe consists of a series of individual pipe lengths interconnected to each other. One pipe length secured to the underside of each railcar interconnects to another such pipe length via a flexible coupler situated between each railcar. The brake pipe supplies the pressurized air that is required by the brake control system to charge the various reservoirs and operate the air brake equipment on each railcar in the freight train.

A train operator situated in the lead locomotive can manipulate a brake handle to apply and release the brakes on the railcars as desired. The brake handle can be moved from and in between a release position at one extreme in which brake pipe pressure is maximum and the brakes are completely released to an emergency position at another extreme in which brake pipe pressure is minimal and the brakes are fully applied. The brake handle positions thus include brake release, minimum service brake application, full service brake application and emergency brake application. When the brakes are released, the reservoirs and the brake pipe are generally charged to the same pressure: typically 90 psi on a freight train and 110 psi on a passenger train. When the brakes are applied, the pressure in the brake pipe is reduced via a valve located in the lead locomotive. The exact amount by which the pressure is reduced depends into which of the application positions the brake handle is placed. It is this pressure reduction that signals the brake control valve on each railcar to supply pressurized air from the appropriate reservoir(s) to the brake cylinders. The brake cylinders convert this pressure to the mechanical force that the brake shoes apply to slow or stop the rotation of the wheels on the railcar.

Figure 1:
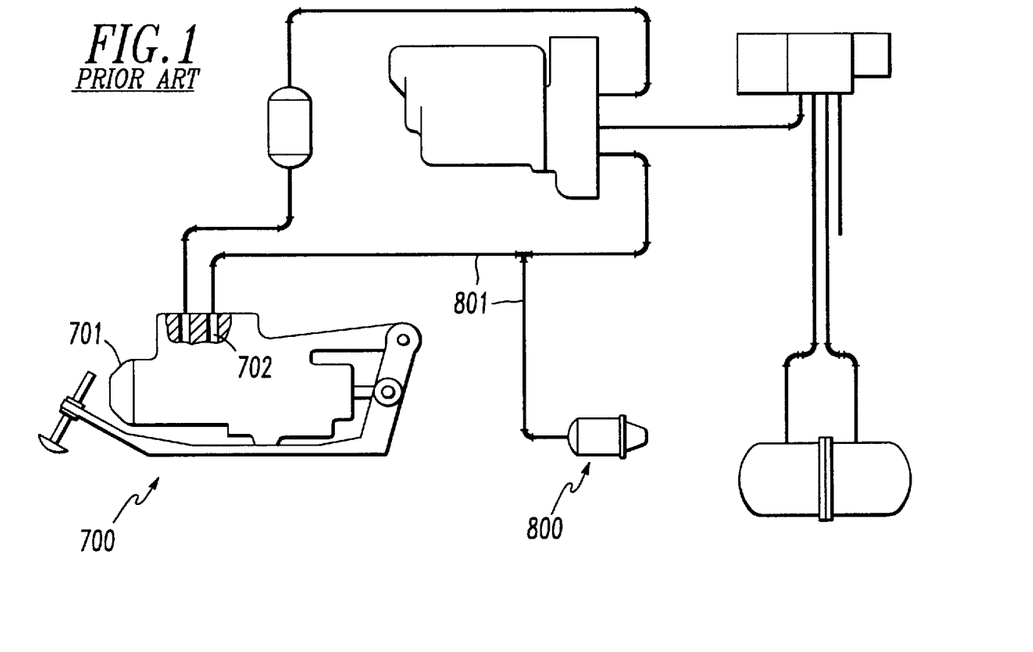
FIG. 1 is a schematic diagram of air brake equipment for a typical freight railcar including an S-1 load sensor valve.

FIG. 1 illustrates a schematic diagram of the air brake equipment of a typical freight railcar equipped with empty and load brake equipment. The air brake equipment typically includes one or more brake cylinders, an emergency air reservoir, an auxiliary air reservoir and an "ABD" or similar type pneumatic brake control valve. The operation of the pneumatic brake control valve as well as a description of its components is well known in the railroad industry.

Each freight railcar may include empty and load brake equipment such as a P-1 load proportional valve and an S-1 type or an ELX type load sensor valve all of which are made by the Westinghouse Air Brake Company (WABCO) and are well known in the brake control art. The objective of empty and load brake equipment is to reduce braking on the railcar if it is empty and to permit heavier braking on the railcar if it is loaded. On a freight train with railcars equipped with empty and load brake equipment, the braking is more uniformly applied throughout the train in accordance with the load borne by the railcars. This tends to reduce the slack between adjacent railcars and improves overall handling of the freight train.

Regarding the operation of a load sensor valve, the S-1 load sensor valve, for example, automatically senses whether the railcar is loaded or empty generally by measuring the relationship between the body of the railcar and the top of the side frame of the truck. Each railcar typically has two trucks, one at each end. Each truck includes the wheels and axles and other parts that together form the structure that supports the body of the railcar. Suspension springs are used to dampen vibrations that would otherwise be transmitted from the wheels to the railcar body and that may otherwise damage the load being transported. These suspension springs deflect or compress to an extent proportional to the weight of the load carried by the railcar.

Typically mounted to the underside of the railcar body, the S-1 load sensor valve uses its sensor arm to measure the distance between the railcar body and the top of the truck side frame. When loaded, the railcar body further compresses the springs thereby reducing the distance between the railcar body and the truck side frame. The distance that the sensor arm can travel is therefore limited. Conversely, when the railcar is empty, the springs are less compressed thereby maximizing the distance between the railcar body and the truck side frame. The distance that the sensor arm can travel is then at its maximum.

When the S-1 load sensor senses that the railcar is empty, its internal mechanism serves to regulate the flow of air to the P-1 load valve. When the railcar is empty, the P-1 load proportional valve controls the flow of air to the brake cylinder so that the brake cylinder pressure is approximately 60% of what it would be if the railcar were loaded no matter how much the pressure is reduced in the brake pipe. During brake applications, the equalizing volume is used to maintain a satisfactory relationship between pressure in the empty and load brake equipment and that in the control valve and its reservoirs when the railcar is empty. Empty and load brake equipment such as the type alluded to in this document is described in U.S. Pat. Nos. 5,005,915 and 5,100,207. These patents are assigned to the assignee of the present invention, and their teachings are incorporated into the present document by reference.

Figure 2:
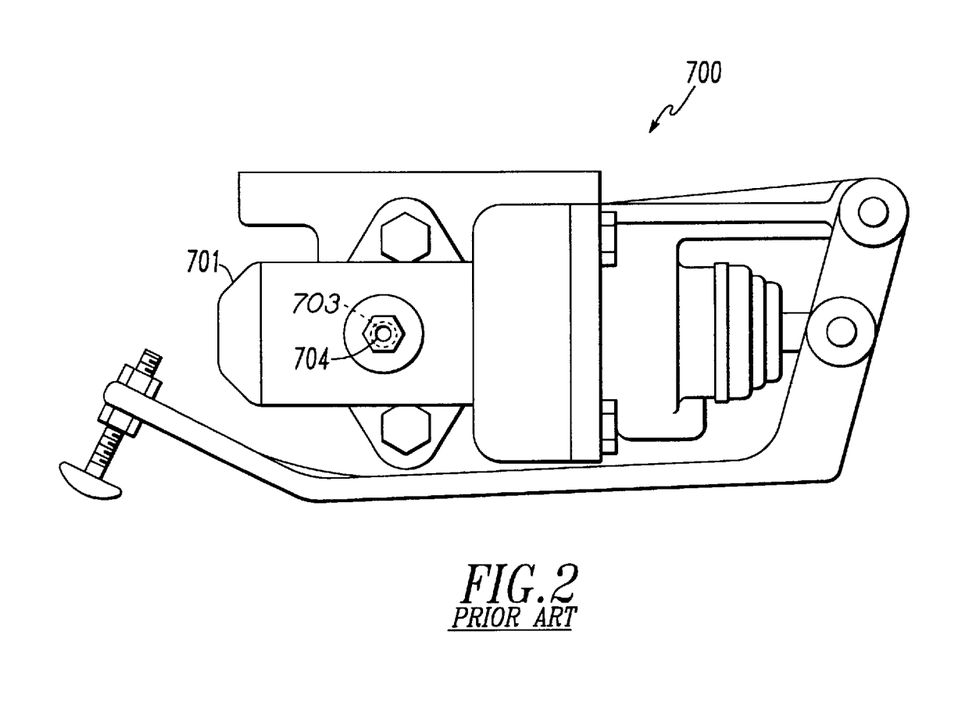
FIG. 2 is a side view of the S-1 load sensor valve shown schematically in FIG. 1.

Whether of the S-1 type or ELX type, the load sensor valve features one or more internal chambers or passageways. An interconnecting pipe connects at least one of these chambers or passageways to the brake cylinder as shown, for example, in the schematic of FIG. 1. An S-1 load sensor valve of the type shown schematically in FIG. 1 is illustrated in FIG. 2. The left side of the housing of the load sensor valve features a generally cylindrical portion flanked by two bolts. Between these bolts and screwed into a threaded bore in the cylindrical portion is a pipe plug. Removal of the pipe plug provides direct access to the chamber that communicates with the brake cylinder via the interconnected pipe shown in FIG. 1. The threaded bore in the housing can thus be used as an access port through which to access the pressure in the brake cylinder from the load sensor valve.

The American Association of Railroads (A.A.R.) has proposed that each railcar of a freight train be provided with a mechanism that would allow the pressure within the brake cylinder to be read quickly. At present, the A.A.R. is considering whether to issue a specification requiring that a commercially available quick connect type fitting be used to access the pressure within the brake cylinder. The disadvantage of such a fitting, however, is that it provides only a single valve with which to contain the pressure to be measured. That is, while such a fitting is not being used to access the pressure, it offers only one valve to prevent leakage of the pressure that it supposed to contain. Unless the fitting is routinely covered to protect the valve when the fitting is not being used to access the brake cylinder pressure, the valve is exposed to dust, dirt and/or other potential contaminants. It is, of course, important that such a fitting prevent leakage of pressure from the brake cylinder otherwise operation of the brakes may be adversely affected.

It should be noted that the foregoing background information is provided to assist the reader in understanding the instant invention. Accordingly, any terms used herein are not intended to be limited to any particular narrow interpretation unless specifically stated otherwise in this document.

OBJECTIVES OF THE INVENTION

It is, therefore, a primary objective of the invention to provide a highly reliable fitting that allows the pressure within a brake cylinder of a railcar to be measured quickly.

Another objective is to render the pressure within the brake cylinder quickly measurable with a fitting that features two valves so if one valve should leak the other valve will prevent leakage of the air that the fitting is supposed to contain.

Yet another objective is to design such a dual valve fitting with a protuberant end with which it can mate with a female coupler of quick connect device so that the pressure within the brake cylinder can be measured quickly by mating the fitting with its corresponding female coupler which has attached at its other end a pressure measuring device.

Still another objective of the invention is to provide such a dual valve fitting to enable quick measurement of pressure within any other type of piping or vessel capable of holding air or other type of suitable fluid under pressure.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the attached drawings and with the appended claims.

SUMMARY OF THE INVENTION

In a presently preferred embodiment, the invention provides a dual valve fitting for enabling quick measurement of pressure contained within a housing. The fitting includes first and second valve bodies. The first valve body defines a flow passage from its threaded end to its protuberant end; the protuberant end being shaped to mate with a female coupler of a quick connect device. Situated in the flow passage, a first valve features a poppet type head at a top end of a valve stem that is seatable against an outer annular valve seat formed in the flow passage. A first mechanism for biasing compels the poppet type head against the outer annular valve seat so that the first valve is normally closed. The second valve body defines a flow bore from its upper threaded end to its lower threaded end which communicates with the flow passage of the first valve body. The upper threaded end connects with the threaded end of the first valve body whereas the lower threaded end is designed to screw into a threaded bore of a housing. Situated in the flow bore, a second valve features a retainer that defines in its top end a recess that retains a check seal element that is seatable against an inner annular valve seat formed in the flow bore. A second mechanism for biasing acts upon the retainer so that the check seal element therein seats against the inner annular valve seat thereby rendering the second valve normally closed. A stem extension is disposed between a bottom end of the valve stem and a top side of the check seal element. When mated to the protuberant end of the fitting, such female coupler causes translation of the valve stem, the stem extension and the retainer thereby opening both the first and second valves. This allows flow from such housing through the flow bore and the flow passage and into such female coupler.

BRIEF DESCRIPTION OF THE DRAWINGS

FIG. 3b is a cross sectional view of the dual valve fitting shown in FIG. 3a.

FIGS. 3c–d are partial cut away views of the dual valve fitting shown in FIG. 3a.

FIG. 3e is a bottom view of the dual valve fitting shown in FIG. 3a.

FIG. 3f is a perspective, exploded view of the dual valve fitting shown in FIG. 3a.

DETAILED DESCRIPTION OF THE INVENTION

Before describing the invention in detail, the reader is advised that, for the sake of clarity and understanding, identical components having identical functions in each of the accompanying drawings have been marked where possible with the same reference numerals in each of the Figures provided in this document.

FIGS. 1 and 2 each illustrate a housing 701 of an S-1 load sensor valve 700. The housing 701 defines a chamber or internal passageway 702 that communicates with a brake cylinder 800 of a railcar. Typically, an interconnecting pipe 801 connects the chamber 702 to the brake cylinder 800. The housing 701 also defines a threaded bore/pipe tap 703 that communicates with the chamber 702, as best shown in FIG. 2. Removing a pipe plug 704 from the pipe tap 703 provides direct access to chamber 702. Pipe tap 703 can thus be used as an access port through which to access the pressure in the brake cylinder from the S-1 load sensor valve.

FIGS. 3*a–h* and 4–6 illustrate the essential details of the various embodiments of the present invention, namely, a dual valve fitting. The dual valve fitting in each of these embodiments enables quick measurement of the brake cylinder pressure within the housing of an S-1 type or an ELX type load sensor valve or load sensor valves made by various other railroad equipment manufacturers. It should be apparent from a reading of this document that the dual valve fitting described and claimed herein can, of course, be applied to any other type of housing, piping or vessel capable of holding air or other fluid under pressure.

In a first embodiment shown in FIGS. 3*a–f*, the dual valve fitting 1 basically includes a valve body 2, a valve retainer 3, first and second sealing rings 4 and 5 and a means for biasing 6 the valve retainer 3 within a flow passage 7 defined by the valve body 2. The valve body 2 has a protuberant end 20 that is shaped to mate with a female coupler of a quick connect device. The valve body 2 also has a threaded end 21 that is designed to screw into the threaded bore 703 of any suitable housing such as that of the S-1 load sensor valve 700.

The valve retainer 3 defines around itself first and second annular recesses 31 and 32. These annular recesses 31 and 32 are spaced apart from each other so as to match the spacing of outer and inner annular valve seats 71 and 72 formed in the flow passage 7. Forming a first valve, the first sealing ring 4 fits into the first annular recess 31 so as to seat against the outer annular valve seat 71 when the first valve is closed. Forming a second valve, the second sealing ring 5 lodges into the second annular recess 32 so as to seat against the inner annular valve seat 72 when the second valve is closed. The sealing rings 4 and 5 may be composed of rubber or any other suitable sealing material.

Figure 3A:
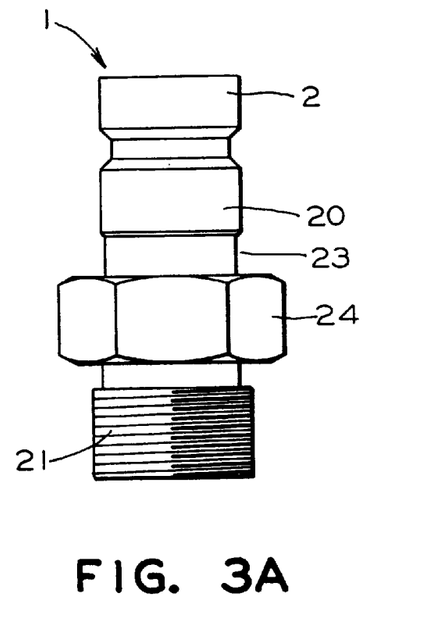
FIG. 3a is a front view of a dual valve fitting according to a first embodiment of the invention, a rear view thereof being the same as the front view.
Figure 3B:
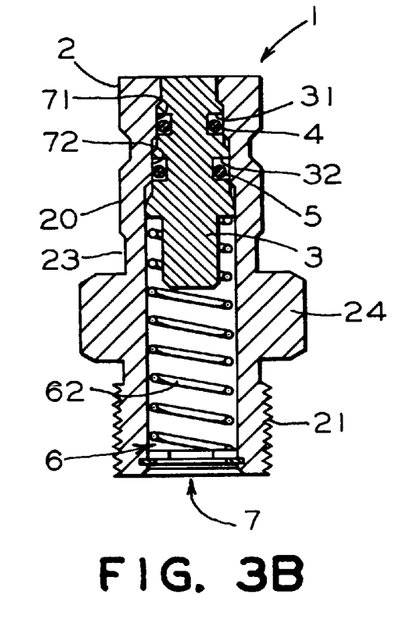
Figure 3C:
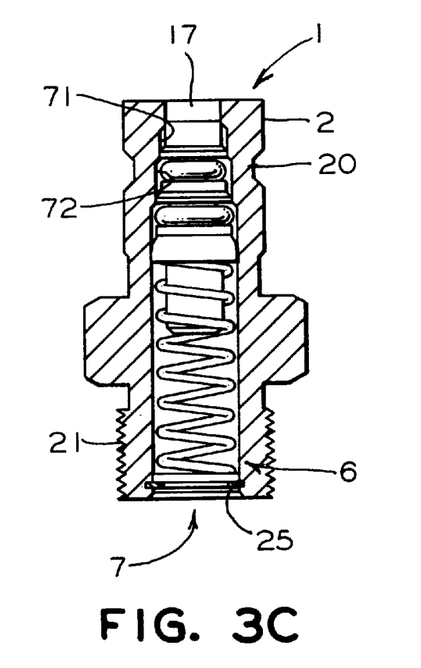
Figure 3D:
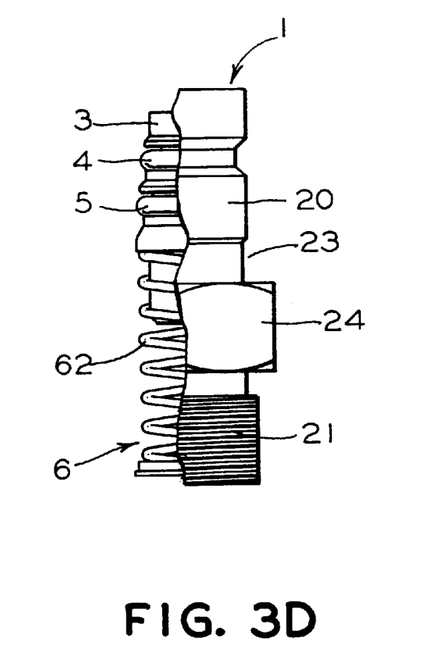
Figure 3E:
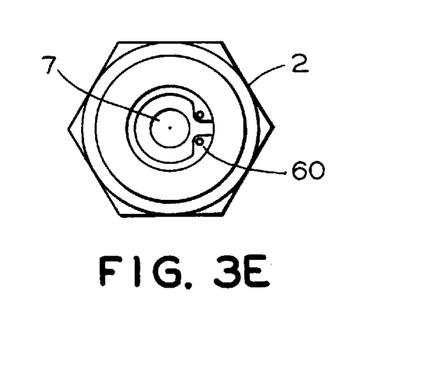

The means for biasing 6 acts upon the valve retainer 3 so that he first and second sealing rings 4 and 5 seat against the outer and inner annular valve seats 71 and 72, respectively. The means for biasing 6 thus renders the first and second valves normally closed. It is in this normally closed position which these valves are shown in FIG. 3*b*. FIGS. 3*c–d* show the first and second valves in the open position.

The valve retainer 3 is designed so that the first annular recess 31 has a diameter smaller than the second annular recess 32. The first and second sealing rings 4 and 5, of course, must have their internal diameters dimensioned accordingly so that each sealing ring properly retains within its respective recess. Similarly, the flow passage 7 is shaped so that the outer annular valve seat 71 has an internal diameter that is smaller than that of the inner annular valve seat 72. It is this arrangement that provides the first valve with a smaller effective diameter than that of the second valve. The first and second valves thus reside in their normally closed positions by virtue of the action of the means for biasing 6 on valve retainer 3. When in the closed position, the first and second valves thus each prevent leakage of the air pressure from the housing 701.

Figure 3F:
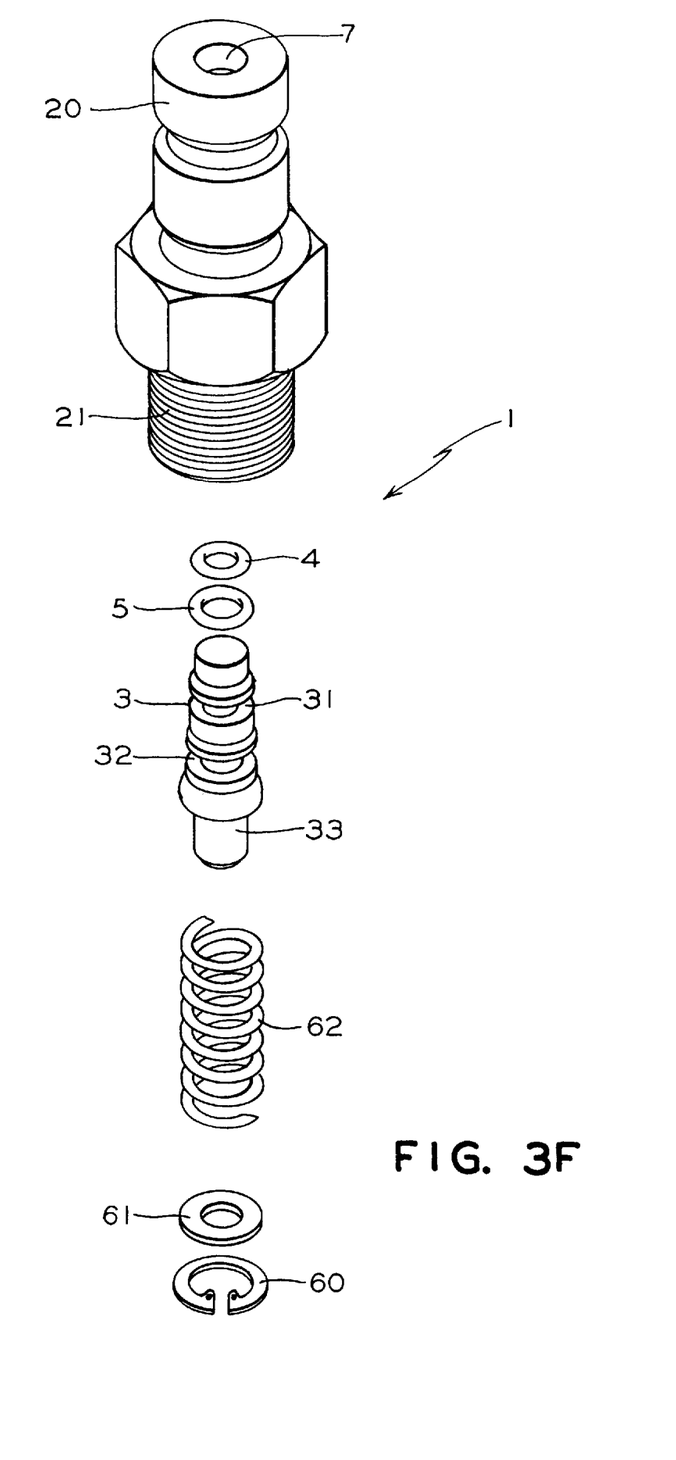

The means for biasing 6 preferably includes a retaining ring 60 and a spring 62, as best shown in FIG. 3*f*, though it can take the form of various other types of mechanical apparatus. The retaining ring 60 securely wedges into an annular groove 25 that is formed in the flow passage 7 near the bottommost part of threaded end 21 of valve body 2. The spring 62 is disposed between the retaining ring 60 and a bottom end of valve retainer 3. The spring 62 thus compresses the first and second sealing rings 4 and 5 into the outer and inner annular valve seats 71 and 72. The retaining ring 60 may also include a washer 61 to further support the bottom of spring 62 within the flow passage 7 of valve body 2.

The valve body 2 also includes a hexagonal outer portion 24 between the protuberant and threaded ends 20 and 21 to accommodate a wrench with which to screw securely the fitting 1 into the threaded bore 703 of the housing 701. Disposed within a groove formed adjacent to an underside of the hexagonal outer portion 24 adjacent the threaded end 21 of valve body 2 is an o-ring. When the threaded end 21 of the dual valve fitting is screwed into the threaded bore 703, it is with this o-ring that the valve body 2 is sealed against the housing. Alternatively, this seal may be implemented using a pipe tap arrangement.

Mating such female coupler of such quick connect device to the protuberant end 20 of the dual valve fitting 1 causes the valve retainer 3 to move inwardly against the spring 62. This moves the first and second valves away from the outer and inner valve seats 71 and 72. With both the first and second valves open, air is allowed to flow from the housing into the threaded end 21 of flow passage 7. The air continues flowing past spring 62 around valve retainer 3 until it emerges from the protuberant end 20 of flow passage 7. Finally, the air stream passes into the female coupler. Using a pressure measuring device connected to the opposite end of the female coupler, the pressure of the air contained within the housing can thus be quickly read.

Figure 3G:
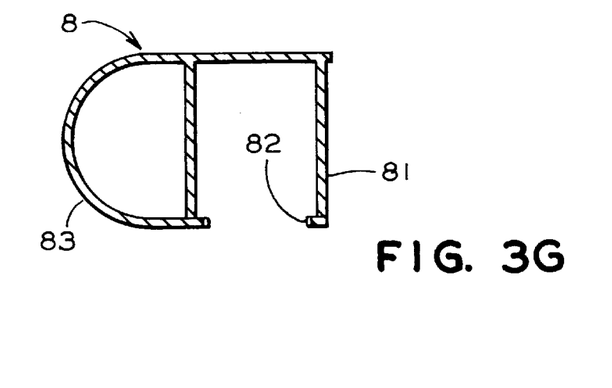
FIG. 3g is a cross sectional view of a protective cap that may be used to protect the invention from contaminants.
Figure 3H:
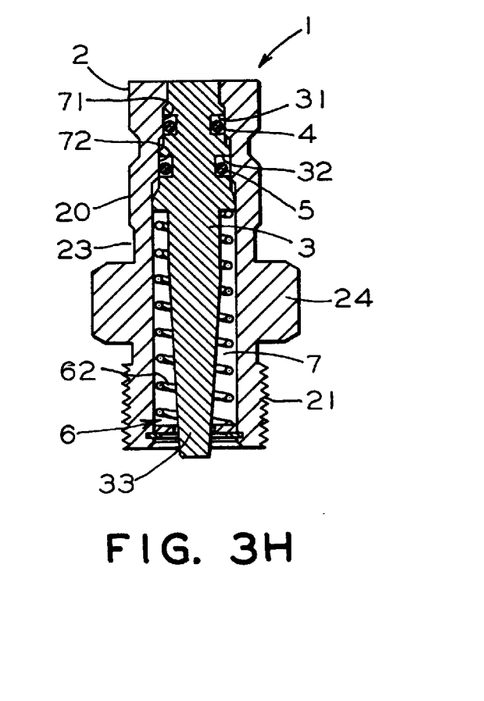
FIG. 3h is a cross sectional view of the dual valve fitting showing housed therein a shaft protruding from the bottom end of a valve retainer.

Referring to FIG. 3*f*, the valve retainer 3 may also feature a shaft 33, cylindrical or otherwise, about which spring 62 can be disposed concentrically to further stabilize the biasing means 6. As shown in FIG. 3*h*, this shaft 33 may be made long enough so as to protrude from the threaded end 21 when the dual valve fitting 1 is coupled with a female coupler. When used to access pressure in certain housings which have yet a third valve located at the bottom of the threaded bore, the dual valve fitting via shaft 33 can be used to unseat this third valve.

It is also preferred that the outer and inner valve seats 71 and 72 be formed within flow passage 7 so that the first valve opens before, and closes after, the second valve. With this closing sequence, the dual valve fitting 1 protects against leakage should dust, dirt or other contaminants prevent the outer, first valve from closing completely. As best shown in FIG. 3*c*, it is also preferred that the top end of valve retainer 3 never leave the top section 17 of flow passage 7 when both the first and second valves are completely opened.

Figure 4:
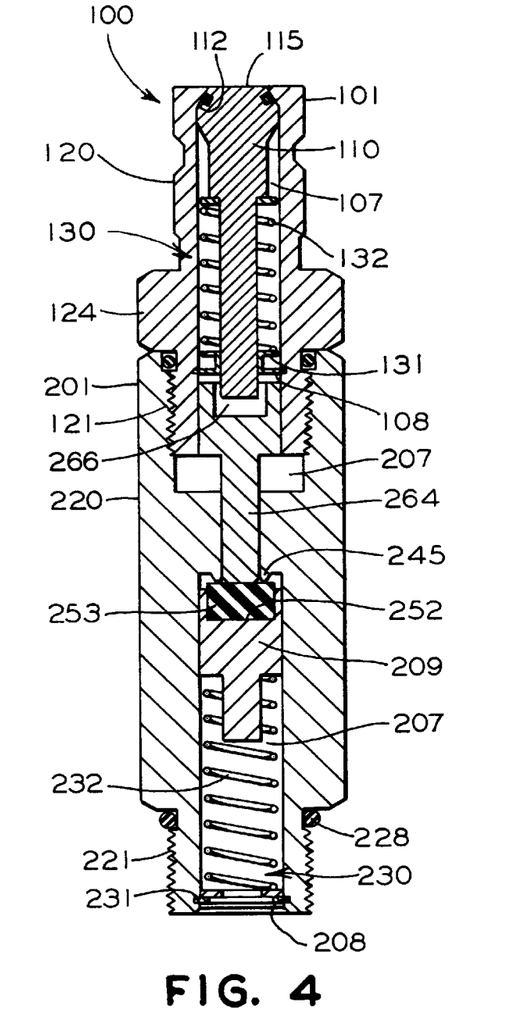
FIG. 4 is a cross sectional view of a dual valve fitting according to a second embodiment of the invention.

In a presently preferred second embodiment shown in FIG. 4, the dual valve fitting 100 includes first and second valve bodies 101 and 201. The first valve body 101 has a protuberant end 120 that is shaped to mate with a female coupler of a quick connect device. The first valve body 102 also has a threaded end 121 that is designed to screw into the second valve body 201 as provided below. Defined within the first valve body between its ends is a flow passage 107. An outer annular valve seat 112 is formed within flow passage 107 at or near the opening of protuberant end 120.

Situated in flow passage 107, a first valve features a poppet type head 115 at a top end of a valve stem 110. The poppet type head 115 may be composed of rubber or any other suitable sealing material. A first means for biasing 130 compels the poppet type head 115 against the outer annular valve seat 112. The first means for biasing preferably includes a first retaining ring 131 and a first spring 132, though it can take the form of various other types of mechanical apparatus. The retaining ring 131 is secured within an annular groove 108 formed within flow passage 107 of first valve body 101. The first spring 132 is disposed concentrically about valve stem 110 between the first retaining ring 131 and the underside of poppet type head 115. It is first spring 132 that forces the poppet type head 115 against the outer valve seat 112 so that the first valve is normally kept closed.

The second valve body 201 has an upper, internally threaded end 220 that is designed to accommodate the threaded end 121 of first valve body 101. The second valve body also has a lower threaded end 221 that is screwable into the threaded bore 703 of any suitable housing such as that of the S-1 load sensor valve 700. Defined within the second valve body between its ends is a flow bore 207 that communicates with the flow passage 107 of first valve body 101.

Situated in flow bore 207, a second valve features a retainer 209 that defines in its top end a recess 252. Retained in this recess is a check seal element 253 whose top side is seatable against an inner annular valve seat 245 formed in flow bore 207. The check seal element may be composed of rubber or any other suitable sealing material. A second means for biasing 230 acts upon retainer 209 so that the check seal element 253 therein seats against the inner annular valve seat 245. The second means for biasing 230 preferably includes a second retaining ring 231 and a second spring 232, though it can take the form of various other types of mechanical apparatus. The second retaining ring is retained within an annular groove 208 formed within flow bore 207 at the lower threaded end 221 of second valve body 201. The second spring 232 is disposed between the second retaining ring 231 and the bottom end of the retainer 209. The bottom end of retainer 209 may feature a shaft, cylindrical or otherwise, about which second spring 232 can be disposed concentrically to further stabilize the second biasing means 230. It is second spring 232 that forces the check seal element 253 in retainer 209 against the inner annular valve seat 245 so that the second valve is normally kept closed.

The dual valve fitting 100 also includes a stem extension 264 disposed between a bottom end of valve stem 110 and the top side of check seal element 253. The stem extension at its top preferably defines a cavity into which the bottom end of valve stem 110 protrudes even when the first valve is closed. Preferably a dead space 266 is provided between the bottom end of valve stem 110 and the top of stem extension 264 within this cavity. By virtue of dead space 266, the poppet type head 115 can be unseated from the outer annular valve seat 112 while the check seal element 253 remains seated on inner annular valve seat 245. With the first valve opened in this manner, the integrity of the second valve can thus be tested when the dual valve fitting 100 is connected to a pressure bearing housing such as the S-1 load sensor valve 700.

The first valve body 101 may also include a hexagonal outer portion 124 between the protuberant and threaded ends 120 and 121 to accommodate a wrench with which to screw first valve body 101 into the upper threaded end 220 of second valve body 201. Disposed within a groove formed adjacent to an underside of the hexagonal outer portion 124 adjacent the threaded end 121 is an o-ring. When the threaded end 121 of first valve body 101 is screwed into the upper threaded end 220, it is with this o-ring that the first valve body 101 is sealed against second valve body 201. This seal may instead be implemented using a pipe tap arrangement.

The second valve body 201 also defines an annular groove formed on its outside surface above its lower threaded end 221. An o-ring 228 securely fits into this groove. It is with this o-ring 228 that the second valve body 201 is sealed against the housing 701 when the lower threaded end 221 is screwed into the threaded bore 703 of the housing. This seal, too, may be implemented using a pipe tap arrangement.

Mating the female coupler of the quick connect device to the protuberant end 120 of the dual valve fitting 100 causes the valve stem 110 to move inwardly against first spring 132. Through such movement, the bottom end of valve stem 110 moves through and beyond dead space 266 and into the top of stem extension 264. The bottom of stem extension 264, in turn, drives check seal element 253 off inner annular valve seat 245 as retainer 209 moves inwardly against second spring 232. With both the first and second valves open, air is allowed to flow from the housing into the lower threaded end 221 of flow bore 207. The flow of air continues past second spring 232 around retainer 209 and stem extension 264 into flow passage 107 of first valve body 101. Flowing past first retaining ring 131, first spring 132 and poppet type head 115, the air emerges from the protuberant end 120 of flow passage 107. Finally, the air stream passes into the female coupler. Using a pressure measuring device connected to the opposite end of the female coupler, the pressure of the air contained within the housing can thus be quickly read.

Figure 5:
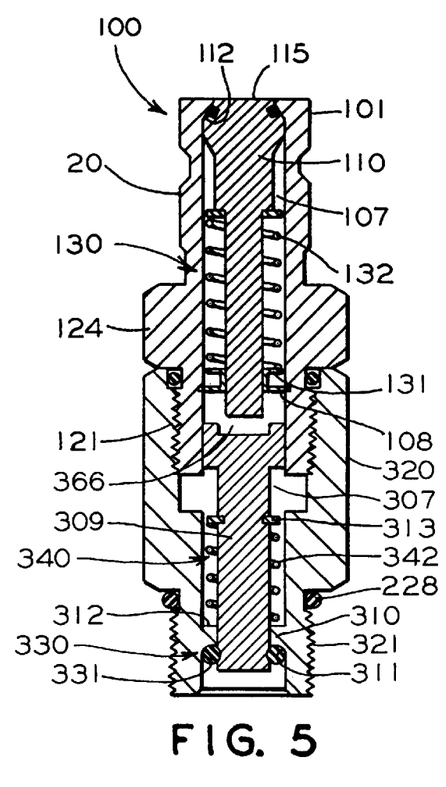
FIG. 5 is a cross sectional view of a dual valve fitting according to a third embodiment of the invention.
Figure 6:
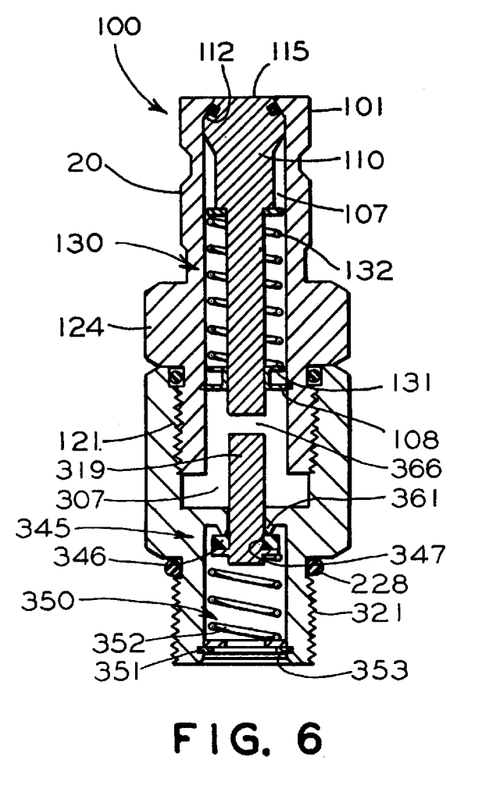
FIG. 6 is a cross sectional view of a dual valve fitting according to a fourth embodiment of the invention.

In a third and a fourth embodiment shown in FIGS. 5 and 6, respectively, the dual valve fitting also includes first and second valve bodies. The first valve body along with the first valve and the first means for biasing that it accommodates are generally identical to that of the second embodiment.

The second valve body has an upper, internally threaded end 320 that is designed to accommodate the threaded end 121 of first valve body 101. The second valve body also has a lower threaded end 321 that is screwable into the threaded bore 703 of any suitable housing such as that of the S-1 load sensor valve 700. Defined within the second valve body between its ends is a flow bore 307 that communicates with flow passage 107 of the first valve body 101.

Situated in flow bore 307, a second valve features a plunger whose top end is disposed opposite the bottom end of valve stem 110. The bottom end of the plunger defines an annular groove in which is retained a means for sealing. This means for sealing is designed to seat against an inner annular valve seat formed in flow bore 307. The means for sealing may be composed of rubber or any other suitable sealing material. A second means for biasing acts upon the plunger so that the means for sealing seats against the inner annular valve seat.

In the third embodiment of the invention shown in FIG. 5, disposed in flow bore 307 approximate its lower threaded end 321 is an annular flange 310 on whose underside is formed the inner annular valve seat 311. The means for sealing 330 that is seatable against this inner valve seat 311 is an o-ring 331. Formed on a top side of annular flange 310 is a lower annular spring seat 312. Formed on plunger 309 near its top end is an upper annular spring seat 313. Spring seat 313 may also be comprised of annular groove defined within plunger 309 in which to retain an retaining ring to serve as the spring seat 313. Along with lower and upper springs seats 312 and 313, the second means for biasing 340 includes a second spring 342 disposed concentrically about plunger 309 between the spring seats. Spring 342 compresses o-ring 331 against the inner annular valve seat 311 so as to keep the second valve normally closed. The second means for biasing 340 can also take the form of various other types of mechanical apparatus.

In the fourth embodiment of the invention illustrated in FIG. 6, the means for sealing 345 preferably takes the form of an annular check type valve 346 that is molded to an annular groove 347 disposed about the bottom end of plunger 319. The second means for biasing 350 preferably includes a second retaining ring 351 and a second spring 352, though it can take the form of various other types of mechanical apparatus. The second retaining ring 351 is retained within an annular groove 353 formed in the lower threaded end 321 of flow bore 307. Second spring 352 is disposed between this second retaining ring and the bottom end of plunger 319. Spring 352 compresses check valve 346 against the inner annular valve seat 361 so as to keep the second valve normally closed.

Referring to both the third and fourth embodiments of the invention, a dead space 366 is preferably provided between the bottom end of valve stem 110 and the top end of the plunger. By virtue of dead space 366, the poppet type head 115 can be unseated from the outer annular valve seat 112 while the second valve remains closed. With the first valve opened in this manner, the integrity of the second valve can thus be tested when the dual valve fitting is connected to a pressure bearing housing such as the S-1 load sensor valve 700.

As with the second embodiment, the second valve body of both the third and fourth embodiments may also define an annular groove formed on its outside surface above its lower threaded end. An o-ring 228 securely fits into this groove. It is with this o-ring/annular groove arrangement or a pipe tap arrangement that the second valve body can seal against the housing 701 when its lower threaded end 321 is screwed into the threaded bore 703 of the pressure bearing housing.

Regarding the operation of the third and fourth embodiments of the dual valve fitting, mating the female coupler of the quick connect device to the protuberant end 120 of first valve body 101 causes the valve stem 110 to move inwardly against first spring 132. Through such movement, the bottom end of valve stem 110 moves through and beyond dead space 366 and into the top of the plunger. The bottom of the plunger, in turn, drives the means for sealing off the inner annular valve seat as the plunger moves inwardly against the second spring. With both the first and second valves open, air is allowed to flow from the housing into the lower threaded end 321 of flow bore 307. The flow of air continues past the second spring around the plunger into flow passage 107 of first valve body 101. Flowing past first retaining ring 131, first spring 132 and poppet type head 115, the air emerges from the protuberant end 120 of flow passage 107. Finally, the air stream passes into the female coupler. Using a pressure measuring device connected to the opposite end of the female coupler, the pressure of the air contained within the housing can thus be quickly read.

In an aspect related to the third and fourth embodiments, the invention also provides an auxiliary valve assembly. The auxiliary valve assembly preferably takes the form of the second valve body of the third and fourth embodiments and is intended to be implemented in conjunction with a male plug of a quick connect device. There are, of course, a variety of quick connect devices commercially available in the market place. The male plug of a standard, commercially available quick connect device would need only be modified to work with the auxiliary valve assembly to make the dual valve fitting in its third and fourth embodiments. For example, the male plug of a standard coupling would have to be modified to mate and interact with the secondary valve body and its associated components such as its upper threaded end and plunger.

Figure 7:
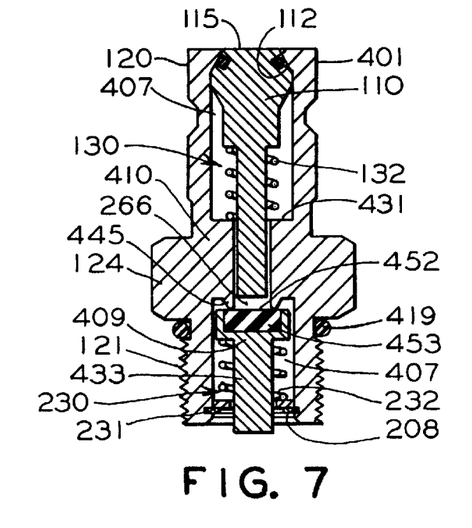
FIG. 7 is a cross sectional view of a dual valve fitting according to a fifth embodiment of the invention.

In a fifth embodiment shown in FIG. 7, the dual valve fitting has only one valve body 401. The valve body 401 has the protuberant end 120 and the threaded end 121 between which is defined a flow passage 407. The threaded end 121 is screwable into the threaded bore 703 of any suitable housing such as that of the S-1 load sensor valve 700. Outer annular valve seat 112 is formed within flow passage 407.

Situated in the upper section of flow passage 407, the first valve features the poppet type head 115 on the top end of valve stem 110. The first means for biasing 130 compels the poppet head 115 against the outer valve seat 112. Though it can take the form of various other types of mechanical apparatus, the first means for biasing preferably includes the first spring 132 and an annular flange 410 on whose top side is formed an upper spring seat 431. The first spring 132 is disposed concentrically about valve stem 110 between seat 431 and the underside of poppet head 115. First spring 132 forces the poppet head 115 against the outer valve seat 112 so that the first valve is normally kept closed.

Situated in the lower section of flow passage 407, a second valve features a retainer 409 that defines in its top end a recess 452. Retained in this recess is a check type valve 453 whose top side is seatable against an inner annular valve seat 445 formed on the bottom side of annular flange 410. Though it can be implemented in other ways, the second means for biasing 230 preferably includes a retaining ring 231 and a second spring 232. The second retaining ring is retained within an annular groove 208 formed within flow passage 407 at the threaded end 121 of valve body 401. Second spring 232 is disposed between retaining ring 231 and the bottom end of retainer 409. It is second spring 232 that pushes check valve 453 in retainer 409 against the inner annular valve seat 445 so that the second valve is normally kept closed.

In this fifth embodiment, the dead space 266 is preferably provided between the bottom end of valve stem 110 and the top side of check valve 453. The dead space 266 allows poppet head 115 to be unseated from outer valve seat 112 while check valve 453 remains seated on inner valve seat 445. With the first valve opened in this manner, the integrity of the second valve can thus be conveniently and quickly tested.

The valve body 401 also preferably includes the hexagonal outer portion 124 between its protuberant and threaded ends to accommodate a wrench with which to screw valve body 401 into a suitable housing. Disposed within a groove formed adjacent to an underside of the hexagonal outer portion is o-ring 419. It is with this o-ring 419 or a pipe tap arrangement that valve body 401 seals against such a housing when threaded end 121 is screwed into the threaded bore 703 of such a pressure bearing housing.

The retainer 409, as part of its bottom end, may also feature a shaft 433, cylindrical or otherwise, about which spring 232 can be disposed concentrically to further stabilize the biasing means 230. As shown in FIG. 7, this shaft 433 may be made long enough so as to protrude from the threaded end 121 when the dual valve fitting is coupled with a female coupler. When used to access pressure in certain housings which have yet a third valve located at the bottom of the threaded bore, the dual valve fitting via shaft 433 can be used to unseat this third valve.

Figure 8:
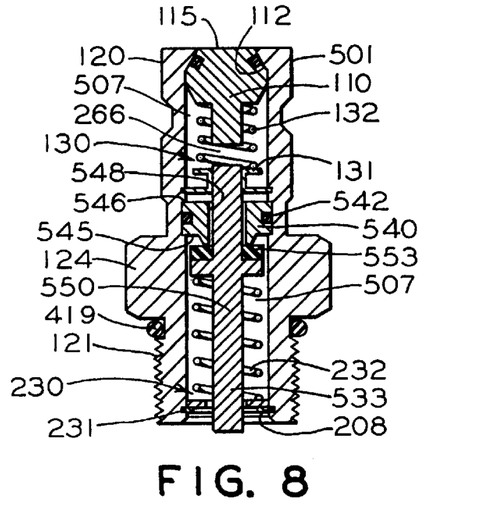
FIG. 8 is a cross sectional view of a dual valve fitting according to a sixth embodiment of the invention.

In a sixth embodiment shown in FIG. 8, the dual valve fitting also has only one valve body 501. The valve body 501 has the protuberant end 120 and the threaded end 121 between which is defined a flow passage 507. The threaded end 121 is screwable into the threaded bore 703 of any suitable housing such as that of the S-1 load sensor valve 700. Outer annular valve seat 112 is formed within flow passage 507.

Situated in the upper section of flow passage 507, the first valve features the poppet type head 115 on the top end of valve stem 110. The first means for biasing 130 compels the poppet head 115 against the outer valve seat 112. Though it can be implemented using other types of apparatus, the first means for biasing preferably includes a spring stop 131 and a first spring 132. The spring stop 131 may be held in place via a projecting rim that can secure within an annular groove defined in flow passage 507. First spring 132 is disposed concentrically about valve stem 110 between stop 131 and the underside of poppet head 115. First spring 132 thus biases the first valve in the closed position.

A cylindrical seat piece 540 features an annular groove around its circumference in which it retains an o-ring 542. It is with this o-ring 542 that seat piece 540 is sealingly secured within flow passage 507. The bottom end 545 of seat piece 540 is shaped as an inner annular valve seat and its opposite end 546 is situated adjacent to the spring stop 131. Along its longitudinal axis, the seat piece 540 also defines through itself an inner bore 548. Extending through this inner bore 548 from the upper to the lower section of flow passage 507 is a valve retainer 550.

Situated in the lower section of flow passage 507, a second valve includes valve retainer 550 and the inner annular valve seat 545 of seat piece 540. The top end of valve retainer 550 is extendable through the inner bore 548 of seat piece 540 to a point preferably a dead space 266 apart from the bottom end of valve stem 110. Around its bottom end, valve retainer 550 carries an annular check type valve 553.

In this sixth embodiment of the invention, the second means for biasing 230 acts upon valve retainer 550 so that the check type valve 553 therein seats against the inner annular valve seat 545. Though it can be implemented in alternative ways, the second means for biasing 230 preferably includes essentially the same structure as that described for the fifth embodiment of the invention. Consequently, it is second spring 232 that forces check type valve 553 of retainer 550 against the inner annular valve seat 545 so that the second valve is normally kept closed. The dead space 266, of course, will allow the first valve to be opened so that the integrity of the second valve can be quickly tested.

The dual valve fitting of this sixth embodiment likewise preferably includes other previously described features. This includes features such as hexagonal portion 124 along with either the o-ring/groove arrangement or the pipe tap arrangement with which valve body 501 seals against the pressure bearing housing. The dual valve fitting may also feature a shaft 533 formed as part of the bottom end of valve retainer 550. Shaft 533 is preferably made long enough so as to protrude from the threaded end 121 when the dual valve fitting is coupled with a female coupler. When used to access pressure in certain housings which have yet a third valve located at the bottom of the threaded bore, shaft 533 allows the dual valve fitting to unseat this third valve.

Referring to all embodiments of the invention, the position of the first valve renders it most exposed to dust, dirt and other potential contaminants. The second valve thus serves as a backup to the first valve should the first valve succumb to such contaminants or otherwise degrade. Conversely, should the second valve degrade, the first valve acts as the backup valve to prevent leakage of air or other fluid from whatever pressure bearing housing to which the invention is connected.

A protective cap may be used to cover the protuberant end of the invention to protect it from contaminants when it is not being used. As shown in FIG. 3g in the context of the first embodiment, though applicable to all other embodiments, the protective cap 8 features a cover 81, a washer 82 and a strap 83. The strap 83 is used to connect the cover 81 to the washer 82 to reduce the likelihood of losing or misplacing the protective cap 8. The washer 82 has an inner diameter that allows it to clip securely into a corresponding annular recess 23 borne by valve body 2, as shown in FIGS. 3a, to hold the protective cap 8 onto the dual valve fitting. The cover 81 is dimensioned so that it can snugly grip the protuberant end 20, yet still easily clip on and off of the dual valve fitting. The dual valve fitting described and claimed in this document can, of course, be applied to many types of housings, pipes or vessels capable of holding air or other type of suitable fluid under pressure.

The presently preferred and alternative embodiments and related aspects for carrying out the invention have been set forth in detail according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and useful arts, we secure for ourselves by Letters Patent exclusive rights to all subject matter embraced by the following claims for the time prescribed by the Patent Act.

What is claimed is:

1. A dual valve fitting for enabling quick measurement of pressure contained within a housing, said fitting comprising:

(a) a first valve body defining a flow passage therethrough from a protuberant end of said first valve body to a threaded end of said first valve body, said protuberant end being shaped to mate with a female coupler of a quick connect device;

(b) a first valve situated in said flow passage, said first valve including a poppet head at a top end of a valve stem for seating against an outer annular valve seat formed in said flow passage at said protuberant end of said first valve body;

(c) a first means for biasing said poppet head against said outer annular valve seat so that said first valve is normally closed;

(d) a second valve body having an upper threaded end for connecting with said threaded end of said first valve body and a lower threaded end for screwing into a threaded bore of such housing, said second valve body defining therethrough a flow bore that communicates with said flow passage of said first valve body;

(e) a second valve situated in said flow bore, said second valve including a retainer that defines in a top end thereof a recess that retains a check seal element therein for seating against an inner annular valve seat formed in said flow bore;

(f) a second means for biasing said retainer so that said check seal element therein seats against said inner annular valve seat thereby rendering said second valve normally closed; and (g) a stem extension disposed between a bottom end of said valve stem and a top side of said check seal element; such that mating such female coupler to said protuberant end of said fitting causes translation of said valve stem, said stem extension and said retainer so as to open both said first and said second valves thereby allowing flow from such housing through said flow bore and said flow passage and into such female coupler.

2. The dual valve coupling fitting recited in claim 1 herein a dead space is provided between said stem extension and said bottom end of said valve stem.

3. The dual valve fitting recited in claim 1 wherein said first means for biasing includes:

(a) a first retaining ring secured within an annular groove formed within said flow passage of said first valve body; and (b) a first spring disposed concentrically about said valve stem between said first retaining ring and said poppet head of said valve stem to compress said poppet head against said outer annular valve seat.

4. The dual valve fitting recited in claim 1 wherein said second means for biasing includes:

(a) a second retaining ring retained within an annular groove formed in said flow bore at said lower threaded end of said second valve body; and (b) a second spring disposed between said second retaining ring and a bottom end of said retainer to compress said check seal element against said inner annular valve seat.

5. The dual valve fitting recited in claim 4 wherein said second spring is situated concentrically about a shaft formed as part of said bottom end of said retainer.

6. The dual valve fitting recited in claim 1 wherein said first valve body features a hexagonal outer portion between said protuberant and said threaded ends.

* * * * *